(12) United States Patent
Wang et al.

(10) Patent No.: US 9,049,420 B1
(45) Date of Patent: Jun. 2, 2015

(54) RELATIVE QUALITY SCORE FOR VIDEO TRANSCODING

(71) Applicant: Google Inc., Mountain View, CA (US)

(72) Inventors: Huisheng Wang, Palo Alto, CA (US); Xiaoquan Yi, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/219,877

(22) Filed: Mar. 19, 2014

Related U.S. Application Data

(63) Continuation of application No. 12/546,453, filed on Aug. 24, 2009, now Pat. No. 8,718,145.

(51) Int. Cl.
| | |
|---|---|
| *H04N 11/20* | (2006.01) |
| *H04N 19/103* | (2014.01) |
| *H04N 19/154* | (2014.01) |
| *H04N 19/176* | (2014.01) |
| *H04N 19/40* | (2014.01) |

(52) U.S. Cl.
CPC ....... *H04N 19/00018* (2013.01); *H04N 19/002* (2013.01); *H04N 19/00278* (2013.01); *H04N 19/00472* (2013.01); *H04N 19/154* (2014.11)

(58) Field of Classification Search
CPC .................................................. H04N 19/154
See application file for complete search history.

(56) References Cited

U.S. PATENT DOCUMENTS

| | | | |
|---|---|---|---|
| 4,255,740 A | 3/1981 | Ferrie | |
| 5,329,379 A | 7/1994 | Rodriguez et al. | |
| 5,426,512 A | 6/1995 | Watson | |
| 5,446,492 A * | 8/1995 | Wolf et al. | 348/192 |
| 5,561,526 A * | 10/1996 | Huber et al. | 356/604 |
| 6,041,145 A * | 3/2000 | Hayashi et al. | 382/268 |
| 6,054,943 A | 4/2000 | Lawrence | |
| 6,072,496 A * | 6/2000 | Guenter et al. | 345/419 |
| 6,415,057 B1 * | 7/2002 | Suzuki et al. | 382/239 |
| 6,493,023 B1 * | 12/2002 | Watson | 348/180 |
| 6,496,221 B1 | 12/2002 | Wolf et al. | |
| 6,801,886 B1 | 10/2004 | Pai et al. | |
| 6,828,967 B1 | 12/2004 | King et al. | |
| 6,898,321 B1 * | 5/2005 | Knee et al. | 382/235 |
| 6,950,561 B2 * | 9/2005 | Boroczky et al. | 382/263 |
| 7,170,933 B2 | 1/2007 | Kouloheris et al. | |

(Continued)

OTHER PUBLICATIONS

IBM Techincal Disclosure Bulletin. "Objective Image and Video Quality Assessment". Jan. 2002, 6 pages.

(Continued)

*Primary Examiner* — Sath V Perungavoor
*Assistant Examiner* — Matthew J Anderson
(74) *Attorney, Agent, or Firm* — Fenwick & West LLP

(57) ABSTRACT

A relative quality score is provided that takes into account properties of an encoded version of a source video. For example, one such quality score calculates a difference of higher and lower quality transcoded versions of the source video, and computes quality metrics for each to evaluate how similar the transcoded versions are to the source video. A relative quality score quantifying the quality improvement of the high-quality version over the low-quality version is computed. The relative quality score is adjusted based on a measurement of the quality of the source video. If the relative quality score for the video indicates a sufficient quality improvement of the high-quality version over the low-quality version, various actions are taken, such as retaining the high-quality version, and making the high-quality version available to users, e.g. via a video viewing user interface.

20 Claims, 5 Drawing Sheets

(56) References Cited

U.S. PATENT DOCUMENTS

| | | | |
|---|---|---|---|
| 7,173,971 B2* | 2/2007 | Amara et al. | 375/240.27 |
| 7,436,885 B2 | 10/2008 | Burg et al. | |
| 7,627,038 B2 | 12/2009 | Moni et al. | |
| 7,814,520 B2 | 10/2010 | Guedalia | |
| 7,844,124 B2* | 11/2010 | Chang | 382/251 |
| 8,159,960 B2 | 4/2012 | Cooppan | |
| 8,254,438 B2 | 8/2012 | Davis | |
| 8,300,961 B2* | 10/2012 | Coulombe et al. | 382/232 |
| 8,331,443 B2 | 12/2012 | Rhie et al. | |
| 8,401,331 B2 | 3/2013 | Sherif et al. | |
| 8,687,702 B2* | 4/2014 | Schmit | 375/240.24 |
| 8,948,465 B2* | 2/2015 | Tiwari et al. | 382/115 |
| 2002/0118743 A1 | 8/2002 | Jiang | |
| 2003/0161406 A1 | 8/2003 | Lee | |
| 2004/0012675 A1* | 1/2004 | Caviedes | 348/180 |
| 2004/0175056 A1* | 9/2004 | Lee | 382/286 |
| 2005/0196066 A1* | 9/2005 | Kim et al. | 382/268 |
| 2006/0140406 A1 | 6/2006 | Van Der Veen et al. | |
| 2007/0088516 A1 | 4/2007 | Wolf et al. | |
| 2007/0201562 A1 | 8/2007 | Ganesh et al. | |
| 2008/0056366 A1* | 3/2008 | Bhaskaran | 375/240.16 |
| 2009/0052540 A1 | 2/2009 | Gutman et al. | |
| 2009/0063561 A1* | 3/2009 | Sayko et al. | 707/104.1 |
| 2009/0265617 A1 | 10/2009 | Randall et al. | |
| 2010/0043044 A1* | 2/2010 | Li et al. | 725/118 |
| 2010/0110199 A1 | 5/2010 | Winkler et al. | |
| 2010/0161340 A1 | 6/2010 | Walsh et al. | |
| 2010/0246990 A1* | 9/2010 | Lertrattanapanich et al. | 382/260 |
| 2013/0107938 A9 | 5/2013 | Fogg et al. | |

OTHER PUBLICATIONS

Sheikh, H and Bovik, A. "Image Information and Visual Quality". (Feb. 2006) IEEE Transactions on Image Proc. vol. 15, No. 2, pp. 430-444.

Cheng et al. "Guaranteeing Quality of Service in Interactive Video-on-Demand Servers". (May 1999) IEEE Trans. on Consumer Elect. vol. 45, No. 2, pp. 396-407.

Office Action for U.S. Appl. No. 12/546,453, Jul. 24, 2013, 9 pages.
Office Action for U.S. Appl. No. 12/546,453, Jan. 2, 2013, 10 pages.

* cited by examiner

RELATIVE QUALITY SCORE FOR VIDEO TRANSCODING

CROSS-REFERENCE TO RELATED APPLICATION

This application is a continuation of U.S. patent application Ser. No. 12/546,453, filed Aug. 24, 2009, which is incorporated herein in its entirety.

BACKGROUND

1. Field of Art

The present invention generally relates to the field of digital video, and more specifically, to methods of quantifying the value of high-quality video transcoding.

2. Background of the Invention

Video codecs, such as MPEG-4 Part 2, MPEG-4 AVC, H.261, H.263, WMV, DIVX, and the like encode a video from an uncompressed source format to compressed format. Video codecs can be either lossless or lossy. A lossy codec may reduce the subjective or perceptual quality of the video relative to the original source video, leading users to have a less positive viewing experience. Thus, for some videos it can be beneficial to use a higher-quality video codec, or a higher-quality setting for a given video codec, that may result in less compression but higher-quality video output to improve the perceived quality of the video. For other videos, however, use of a higher-quality video codec does not produce perceptibly superior results to a human viewer, and thus the amount of added data required to represent the video is not justified.

Video hosting services, such as YOUTUBE or GOOGLE VIDEO, allow users to post videos. Most video hosting services transcode an original source video from its native encoded format (e.g., MOV) into a commonly available format (e.g., ADOBE FLASH or Windows Media Video (WMV)) at a lower quality. The transcoding comprises decoding the source video from the native format into an unencoded representation using a codec for the native format and then encoding the unencoded representation with a codec for the commonly available format. This reduces storage requirements, and also reduces the bandwidth requirements for serving the video to clients. As memory costs decline and high speed connections become more prevalent, it has become possible to store and provide high quality versions of source videos. However, merely storing a high quality version of every video is inefficient, since, as noted, a high quality encoding of a video is not necessarily perceptibly visually superior to a lower quality encoding of the same video. Thus, it is useful to define and apply selection criteria to determine whether or not to create and store a high quality transcoded version of a given video, rather than, or in addition to, a lower quality version.

Existing selection criteria analyze inherent, static characteristics of a given source video—such as its bitrate, dimensions, and the like—to determine whether or not the video is a good candidate for encoding via a higher quality algorithm. However, the use of such criteria sometimes produces poor results, leading to the performance of higher-quality encoding for videos that gain little, if any, additional visual quality by it, or failing to do so for videos that would benefit significantly.

SUMMARY

A relative video encoding quality score is provided that takes into account properties of the encoded version of a source video. For example, one such relative quality score calculates a quality difference between higher and lower quality transcoded versions of the source video, and computes quality metrics for each to evaluate how similar the transcoded versions are to the source video. A relative quality score quantifying the quality improvement of the high-quality version over the low-quality version is computed. The relative quality score is adjusted based on a measurement of the quality of the source video. In one embodiment, the relative quality score is a subjective, perceptual quality score that quantifies a degree to which a human viewer would perceive a visual quality improvement of the high-quality version over the low-quality version.

The relative quality score is used to determine whether the high-quality version of the video should be stored for later retrieval. If the relative quality score for the video indicates a sufficient quality improvement of the high-quality version over the low-quality version, then the high-quality version is retained and made available to users if requested. Otherwise, the high quality version can be discarded to conserve storage In one embodiment, a computer-implemented method generates both a low-quality transcoded version of the source video and a high-quality transcoded version of the source video having higher quality than the low-quality transcoded version. The method further determines a measure of relative quality of the high-quality transcoded version to the low-quality transcoded version and computes a relative quality score based at least in part on the determined measure of relative quality. The method stores the high-quality transcoded version of the video in a video repository responsive at least in part to the relative quality score indicating at least a threshold level of quality.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
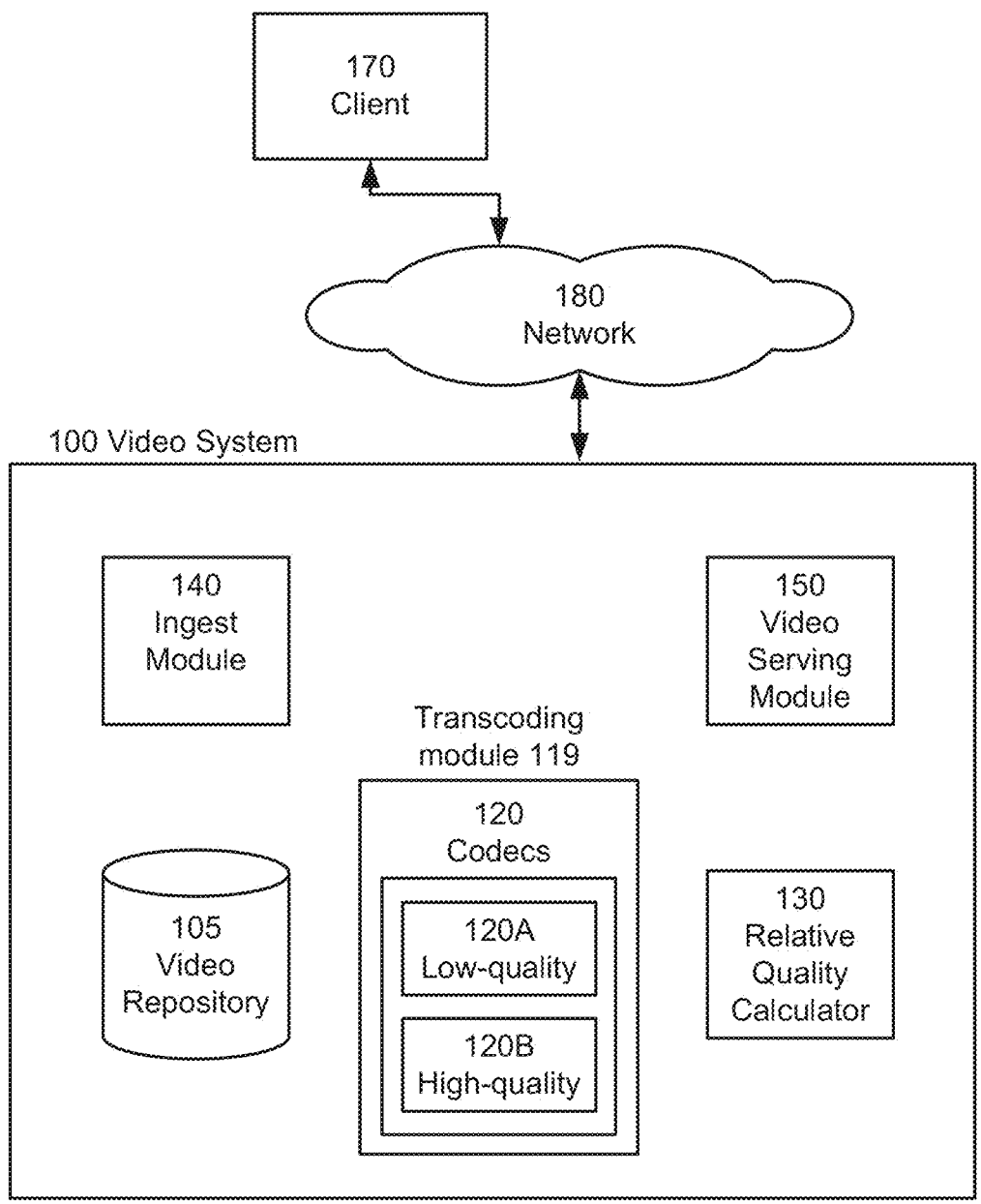
FIG. 1 is a block diagram of a video system in accordance with one embodiment of the present invention.

FIG. 1 illustrates the architecture of a video system 100 for computing video quality scores. A client device 170, such as a user's personal computer, can communicate with the video system 100 via a network 180, performing actions such as submitting videos, or requesting viewing of videos. The method of communication is not limited to any particular user interface or network protocol, but in a typical embodiment a user interacts with the video hosting service via a conventional web browser of the client device 170, which employs standard Internet protocols.

The video system 100 comprises a video repository 105, a transcoding module comprising video codecs 120, a relative quality calculator module 130, an ingest server 140, and a video server 150. These components are now described in more detail.

The videos uploaded by users via the client device 170 are processed by an ingest module 140. The ingest module 140 processes the videos for storage in the video repository 105. The processing can include appropriate transformations for the video content. For example, video processing can include format conversion, compression, metadata tagging, and other data processing. The ingest module 140 processes the videos in order to standardize content for playback to users of the client device 170. This enables the video system 100 to receive uploaded videos of various formats, while still being able to provide a standardized output to users of client device 170. Once uploaded videos have been formatted, the ingest module 140 stores the videos in the video repository 105.

The video serving module 150 retrieves videos from the video repository 105, e.g. in response to a query or to a user request via the client device 170 for a particular video. The video serving module formats the video into a file for transmission to the client device 170.

The video repository 105 comprises original source videos (hereinafter "source videos"), e.g. those uploaded by users of a video hosting website such as YOUTUBE using a client 170. The video repository 105 additionally comprises encoded versions of the videos, either with or without their corresponding original source videos. The encoded versions are videos encoded with various different video codecs, or different levels of quality of a single video codec. Examples of video codecs include MPEG-4 Part 2, MPEG-4 AVC, H.261, H.263, WMV, and DIXV. These video codecs include various selectable levels of quality. For purposes of the following discussion, a given video can be viewed as capable of being encoded using a first video codec, thereby producing a first transcoded version of the video (hereinafter "low-quality" (LQ) version), and of being encoded with a second, higher-quality video codec, or a higher-level of quality of the same video codec, thereby producing a second transcoded version of the video (hereinafter "high-quality" (HQ) version) having higher quality than the first transcoded version. In one embodiment, the video repository 105 includes a low-quality version for each video in the repository, and may or may not include a high-quality version, depending on the value of a relative quality score calculated by the relative quality calculator module 130. The video repository 105 can be implemented in different manners in different embodiments, such as a table or tables of a conventional relational database management system.

The transcoding module 119 comprises the video codecs 120 that implement the encoding and decoding algorithms used to carry out the transcoding, and can be implemented in hardware or in software. The video codecs 120 may represent any number of different encoding algorithms, or levels of quality within a single algorithm (which may be conceptually viewed as constituting multiple separate algorithms), and include at least a low quality video codec 120A and a high-quality video codec 120B, used to produce the low-quality and high-quality versions of a video, respectively. The video codecs 120 include, along with a given encoding algorithm, its corresponding decoding algorithm used to decode data encoded with that algorithm into an unencoded version, which can then be encoded using a different algorithm (or different level of quality within the same algorithm). The difference in "quality" of the low-quality and high-quality video codecs 120A and 120B is defined objectively, using measurements such as the codec supported bit rates, numbers of frames per second, video resolution, or the like. In one embodiment, the same low-quality codec 120A and high-quality codec 120B need not be used for all videos. For example, for one video H.264 may be used to produce the high-quality version and H.263 used to produce the low-quality version; for a different video, a low level of quality of MPEG-4 AVC, e.g., Level 1.2 (320×240@20 fps), may be used to produce the low-quality version and a high level of quality of MPEG-4 AVC, e.g. Level 3 (720×420@30 fps) may be used to produce the high-quality version.

The relative quality calculator module 130 calculates a relative quality score for a video, the relative quality score quantifying an improvement in quality of the high-quality version over the low-quality version of the video. In one embodiment, in contrast to metrics that determine the quality level of a codec based solely on resulting bit rates, resolutions, and the like, the relative quality calculator module 130 models a relative subjective, perceptual quality of the video as it would appear to a human viewer. That is, the relative quality score reflects how a human viewer would perceive the quality of the video, not merely attributes of the encoding algorithms. The actions taken by the relative quality calculator module 130 in arriving at the relative quality score for the video are now described in more detail.

Figure 2:
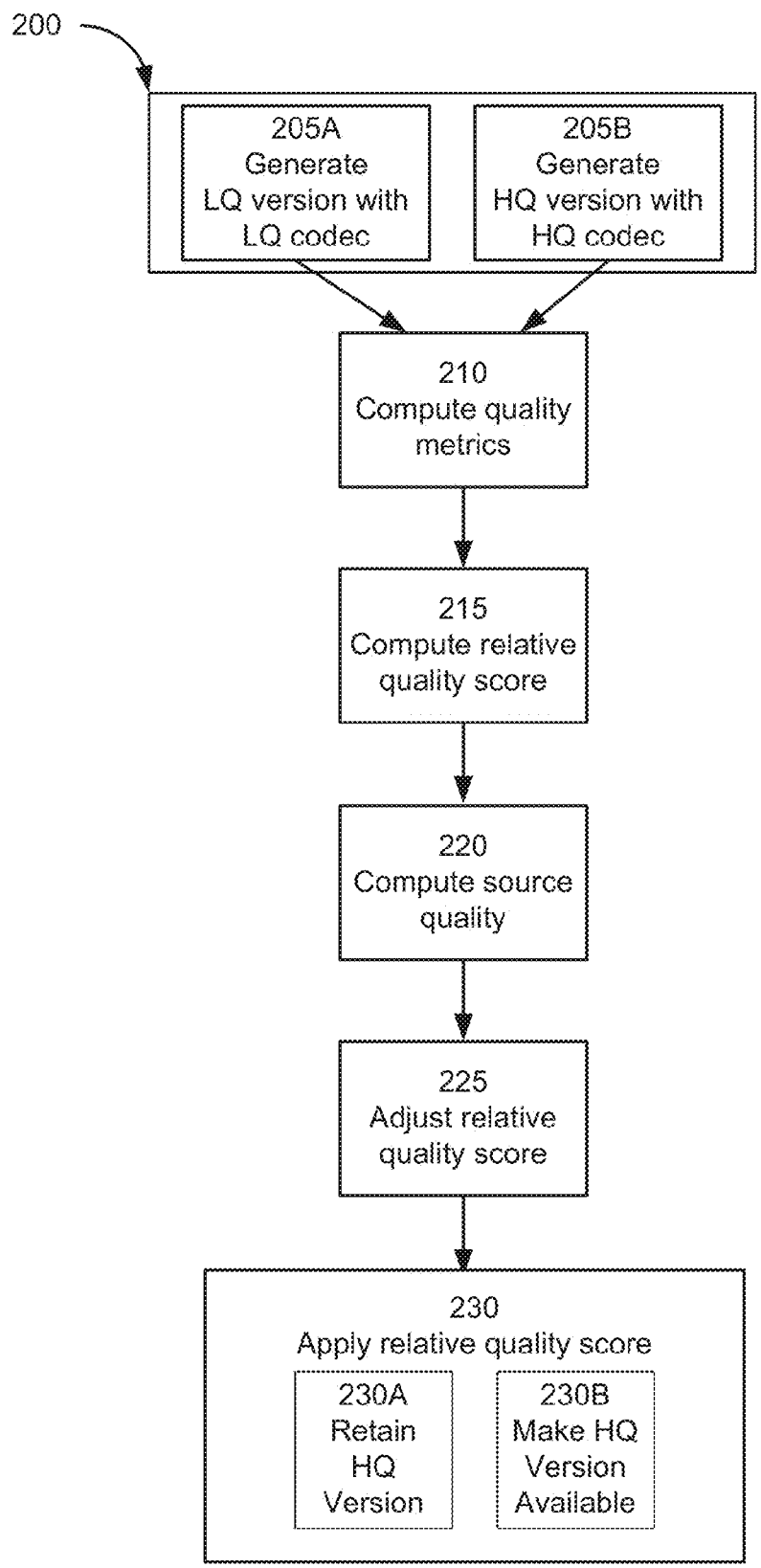
FIG. 2 is a diagram illustrating a high-level flow diagram of the determination of a relative quality score for a video in accordance with one embodiment.

FIG. 2 is a diagram illustrating a high-level flow diagram of the determination of a relative quality score for a video, carried out by the relative quality calculator module 130 of FIG. 1 in accordance with one embodiment. The relative quality score is a real number scaled between 0.0 and 1.0, inclusive, with 0.0 indicating that the high-quality version of the video has no increase in perceptual quality over the low-quality version, and 1.0 indicating the highest level of quality improvement. In one embodiment, the steps of FIG. 2 are performed at video ingest time, when the video is first received by the video system 100, e.g. from a user. In other embodiments, the steps may additionally or alternatively be performed at a later time, after the video is first ingested. The below-described steps are repeated for each video for which the calculation of a relative quality score is desired.

Initially, the video system 100 invokes the low-quality codec 120A and the high-quality codec 120B to generate 205A, 205B respective low quality and high quality transcoded versions of the video from the uploaded source video file. The low-quality and high-quality transcoded versions of the source video, v, are hereinafter denoted trans_l(v) and trans_h(v), respectively.

With the high-quality and low-quality versions generated 205, the relative quality calculator module 130 computes 210 a value of a quality metric for each version trans_l(v) and trans_h(v). The quality metric Qmetric indicates the similarity between the source video v and the transcoded version thereof, either as a whole or for various portions thereof; for example, Qmetric for trans_h(v) as a whole quantifies the average similarity of trans_h(v) to source video v. Higher values of Qmetric indicate that the transcoded version has not been significantly altered from the original source video, and lower values indicate more significant alterations, e.g. resulting from the compression used by the encoding algorithm. Qmetric is not limited to any particular metric; rather, any one of a number of such metrics may be equivalently employed. In one embodiment, Qmetric measures the peak signal-to-noise ratio (PSNR), which expresses the degree of error introduced through a lossy compression algorithm as an average difference in values of corresponding pixels. In another embodiment, Qmetric is based upon Video Quality Metric (VQM) techniques.

With values computed for trans_l(v) and trans_h(v), a relative quality score Qscore representing a degree of difference between the versions is computed 215. Higher Qscore scores indicate a greater difference between the quality of trans_l(v) and trans_h(v), and thus a greater reason to provide the high-quality version. In one embodiment, computing the relative quality score may involve several inquiries. First, the relative quality calculator module 130 determines whether the quality of trans_h(v) is sufficiently poor, e.g. whether its quality metric Qmetric is less than that of trans_l(v), or whether its quality metric Qmetric is less than some predetermined threshold deemed to constitute unacceptable encoding results (hereinafter referred to as Qmetric_lower_bound). If so, then the relative quality score Qscore of trans_h(v) is set to its lowest value, e.g. 0.0, indicating that the high-quality version is not of higher quality than the low-quality version, and the process proceeds to step 230, discussed later below. That is, Qscore is set to its lowest value if the following holds true:

$$Qmetric(trans\_h(v)) < Qmetric(trans\_l(v)) \text{ OR}$$

$$Qmetric(trans\_h(v)) < Qmetric\_lower\_bound.$$

If Qscore does not indicate that the high-quality version is of sufficiently poor quality, then the computation 215 of the relative quality score proceeds. Since human visual perception is limited, there is a threshold level of quality—hereinafter referred to as Qmetric_upper_bound—beyond which human viewers derive no added benefit. In one embodiment, this observation is applied by capping the metric values of both trans_l(v) and trans_h(v) at the predetermined value of Qmetric_upper_bound, and computing Qscore as the difference between the capped values. Thus, if both trans_l(v) and trans_h(v) are of quality that meets or exceeds the threshold, then both are capped at the same value and thus the computed quality difference between them is the lowest value, e.g. 0.0, indicating that the high quality version represents no perceptible improvement over the low quality version. This is represented by the following equations:

$$Qmetric\_capped(trans\_h(v)) = min(Qmetric(trans\_h(v)), Qmetric\_upper\_bound)$$

$$Qmetric\_capped(trans\_l(v)) = min(Qmetric(trans\_l(v)), Qmetric\_upper\_bound)$$

$$Qscore = Qmetric\_capped(trans\_h(v)) - Qmetric\_capped(trans\_l(v))$$

where Qmetric_capped( ) represents the capped metric value, min( ) the conventional minimum function, and Qscore an initial value of the relative quality score, before it is (potentially) adjusted by later operations.

If both trans_l(v) and trans_h(v) meet or exceed the threshold and thus are capped to the same value, thereby leading the Qscore to be set to its lowest possible value of 0.0, then the inquiry proceeds to focus on the difference in metric values of a selected subset of "worst" frames of the source video, rather than that of the metric values of the source and encoded videos as a whole. This in effect shifts the inquiry to determining whether particularly low quality portions of the version trans_l(v) can be perceptibly improved by high quality encoding, even if the video as a whole cannot. In other words, if the ten worst frames in trans_l(v) can be improved in perceptual quality by trans_h(v), then trans_h(v) should be retained, even if its overall quality is not better than the overall quality of trans_l(v).

In one embodiment, the selected subset of worst frames is identified by computing the Qmetric values of individual frames—for example, the Qmetric value of a frame of source video v and its corresponding frame in trans_h(v)—and selecting some worst subset of the lowest-scoring frames. For example, in one embodiment the twenty percent of the frames with the lowest Qmetric values are selected; if fewer than twenty percent of the frames have a Qmetric value indicating a sufficiently large difference, then only the frames indicating a sufficient difference are selected. For purposes of later comparison, the particular worst subset of frames selected for trans_h(v) is the same as that selected for trans_l(v). Then, Qmetric values for trans_l(v) and trans_h(v) are capped at Qmetric_upper_bound and their difference computed, as before. This difference is then weighted by multiplying the difference by the percentage of frames of the video that the worst subset represents (hereinafter denoted p), thus taking into account the fact that only a portion of the video derives a perceptible quality improvement due to the high quality encoding. This is represented by the following equations:

$$Qmetric\_low\_capped(trans\_h(v)) = min(Qmetric\_low(trans\_h(v)), Qmetric\_upper\_bound)$$

$$Qmetric\_low\_capped(trans\_l(v)) = min(Qmetric\_low(trans\_l(v)), Qmetric\_upper\_bound)$$

$$Qscore = (Qmetric\_low\_capped(trans\_h(v)) - Qmetric\_low\_capped(trans\_l(v))) * p$$

where Qmetric_low( ) represents the metric value for the low quality frames, and Qmetric_low_capped( ) represents the capped value thereof.

The relative quality calculator module 130 also computes 220 the quality of the source video, and then uses it in step 225 to adjust the quality difference to arrive at a final relative quality score final Qfinal. This adjustment is based on the observation that a human viewer will tend not to notice an improvement in quality of a video that had particularly poor quality to begin with, instead focusing on the overall poor quality. More specifically, the relative quality calculator module 130 calculates a weighting factor wf as a function of source video quality and applies the weighting factor to limit the relative quality score that a poor quality video can achieve. Source video quality can be determined according to different metrics in different embodiments, such as "blockiness" or number of frames per second, or a multifactor combination thereof.

In one embodiment, the metric for determining the quality of the source video is video "blockiness," which measures the extent to which the blocks used to represent an image have been inadequately encoded. For example, the encoding algorithms for MPEG, H.263, H.264, or the like define 8×8 or 4×4 pixel DCT blocks representing non-overlapping portions of a video frame, and apply a discrete cosine transform (DCT) with quantization to each block. When such an encoding algorithm lacks sufficient detail to encode a detailed image frame, the various blocks tend to stand out in strong visual contrast to each other, with distinct horizontal and vertical edges, leading to blocking artifacts that produce a visual impression of many separate, poorly-blended image blocks rather than a single continuous image. Blockiness artifacts may additionally be introduced by motion compensated prediction, in which portions of the video are described with reference to other portions, such as describing a region of one frame as being the same as a region of a particular earlier frame. Motion compensated prediction techniques encode the image using macroblocks that are typically larger than DCT blocks, such as 16×16 pixels. Whatever the cause of the blockiness, the greater the computed measure of blockiness of a source video, the greater is the visual impression of the image frame being composed of poorly-blended image blocks (e.g., DCT blocks or macroblocks), and thus the viewer's perception of source image quality is correspondingly lower.

Figure 3:
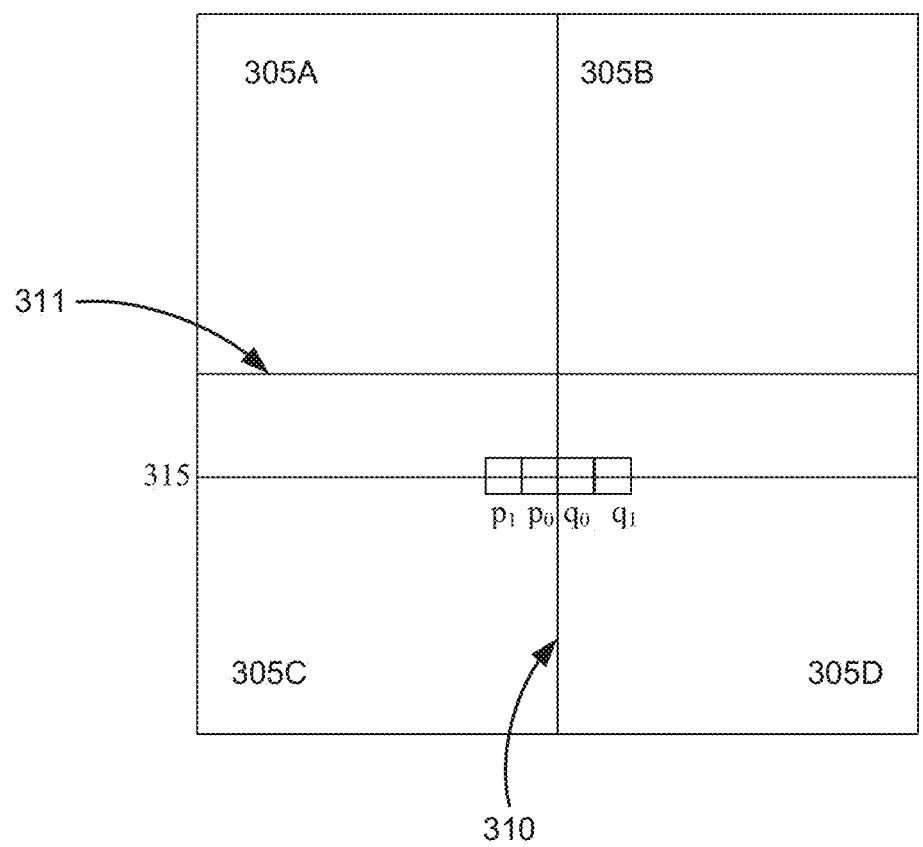
FIG. 3 is a conceptual illustration of computing a blockiness measure for a macroblock, in accordance with one embodiment.

FIG. 3 is an illustration of how blockiness is measured for a frame. FIG. 3 depicts 4 blocks, 305A-305D (from a larger frame containing many such blocks). In one embodiment, blockiness is calculated by moving along block boundaries, comparing pixels on either side of the boundary and tracking a difference total. For example, when computing the blockiness measure of the frame in FIG. 3, a vertical difference is computed by moving along the vertical boundary 310. For each vertical coordinate, the strength of the block discontinuity difference is measured by applying a filter to the some number of pixels on the left and right sides of the boundary 310. For example, at a particular vertical coordinate 315, pixels $p_1$ and $p_0$ on the left side of the boundary 310 are compared to pixels $q_0$ and $q_1$ on the right side. A difference value, d, is calculated according to the equation:

$$d = \text{abs}((|q_0 - p_0| << 2) + |p_1 - q_1| + 4) >> 3$$

where |x−y| denotes the difference between pixels x and y according to some difference metric, such as the difference in the luminance values of the x and y pixels, and << and >> denote the binary shift left and shift right operators, respectively.

Further, left, right, and center differences are computed as in the following equations:

$$\text{diff\_left} = |p_0 - p_1|$$

$$\text{diff\_right} = |q_0 - q_1|$$

$$\text{diff\_center} = |p_0 - q_0|$$

Then, if diff_center is between some predetermined high and low thresholds TH and TL, and diff_left and diff_right are both less than TL, then d is added to a running sum of differences. The comparison of diff_center to TH differentiates the strong, true edges in the frame from blocking artifacts by discarding difference values larger than TH. Likewise, the comparisons to TL discard difference values such that no visible edges (either due to blocking artifacts or inherent picture content) cross the boundary at the location in question. A difference similar to that for vertical boundary 310 is computed for horizontal boundary 311. For simplicity, FIG. 3 depicts only one interior vertical boundary 310 and one interior horizontal boundary 311; in practice, there would typically be a number of such interior vertical or horizontal boundaries, all of which would be added to the running sum.

A normalized difference value, such as a value ranging from 0.0 and 1.0, is computed by dividing the running sum created by adding the d values at the different locations along the boundaries by the total number of boundary pixels in the frame, and by TH, to arrive at a normalized difference value for the frame. That is, $$\text{blockiness\_normalized} = \frac{\Sigma d_i}{TH * \text{num\_edge\_pixels}}$$

where blockiness_normalized is the normalized blockiness value, $\Sigma d_i$ is the sum of the edge pixel differences, and num_edge_pixels is the total number of edge pixels, i.e. the pixels along the horizontal and vertical block boundaries. This normalized difference value is then clamped to the range 0.0 to 1.0, and represents the blockiness measure of the frame, with lower values representing lower blockiness.

Figure 4:
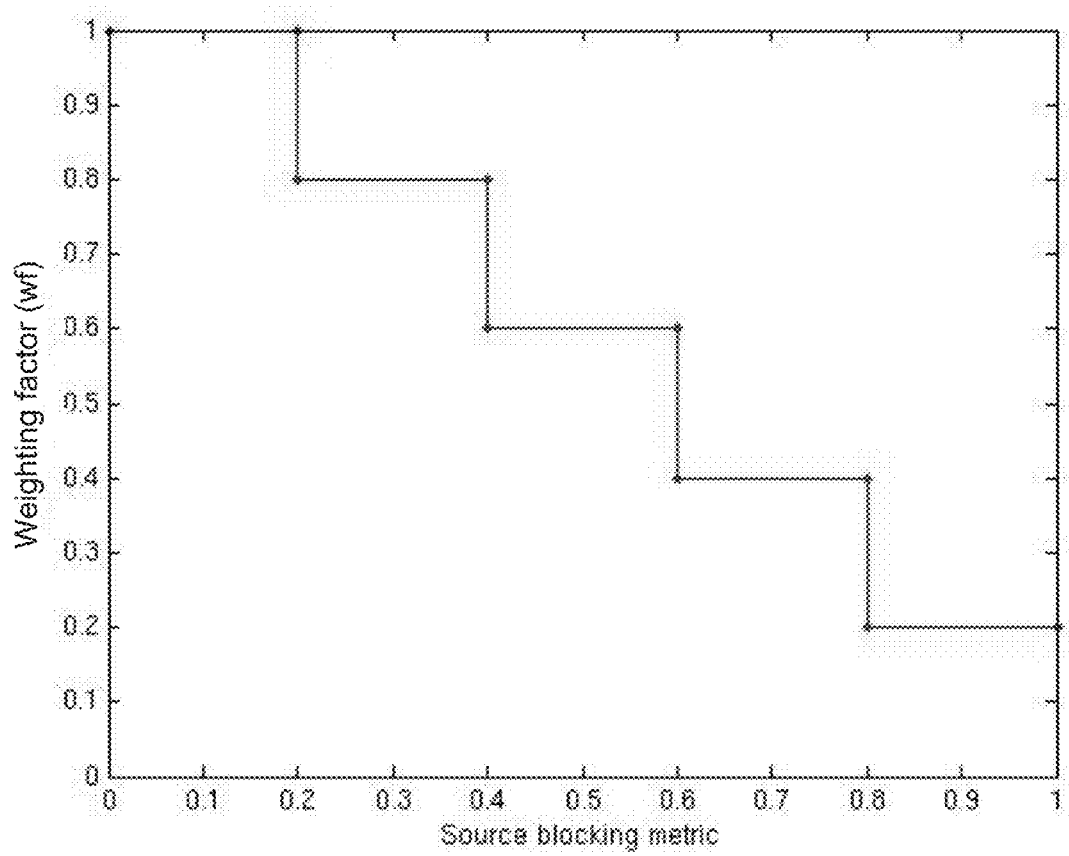
FIG. 4 illustrates an example function for computing a weighting value used to adjust a quality score, in accordance with one embodiment.

The weighting factor wf can be computed from the blockiness measure in a number of different ways, with one embodiment employing the step function depicted in FIG. 4. For example, in FIG. 4, if the blockiness metric is normalized to be in the range 0.0 to 1.0 and the computed blockiness value is between 0.0 to 0.2—indicating a relatively low measure of blockiness—then the resulting value of wf is 1.0, so that the initial relative quality score Qscore is multiplied by 1.0, and thus does not change. If the blockiness value were between 0.8 and 1.0, then Qscore would be multiplied by 0.1, reflecting the fact that the source video quality, as measured by the blockiness value, is poor, and thus the resulting quality score should be forced to a low value. The weighting factor wf could equally be computed in other manners, such as with a continuous function mapping blocking metric values to weighting factors, rather than using the step function depicted in FIG. 4.

Referring again to FIG. 2, with the weighting factor wf computed 220, the relative quality calculator 130 computes 225 Qfinal, the final value of the relative quality score, by appropriately adjusting the Qscore computed in step 215. In one embodiment, the adjustment is performed by multiplying Qscore by the weighting factor wf derived as a function of the calculated blockiness value, as in the following equation:

$$Q\text{final} = \frac{Q\text{score} * wf}{Q\text{metric\_upper\_bound} - Q\text{metric\_lower\_bound}}$$

where Qscore is the metric difference value calculated in step 215, wf is the weighting factor determined in step 220 as a function of the blockiness value, and normalized_weight, like metric_upper_bound and metric_lower_bound, is a predetermined constant. In one embodiment in which PSNR is the quality metric employed, metric_upper_bound and metric_lower_bound have values 45 and 25, respectively, denoting that videos with PSNR values above 45 produce no perceptible improvement for a human user, and that PSNR values below 25 indicate unacceptable quality.

The final quality score value is then mapped to a predetermined range, such as the range 0.0 to 1.0. For example, in one embodiment the final quality score is obtained by the equation:

$$Q\text{final} = \max(0, \min(1, Q\text{final} * \text{normalized\_weight}))$$

The use of normalized_weight serves to spread the typical value of the adjusted quality score to the desired range, and the min and max functions to clamp the value into that range. In one embodiment, normalized_weight is set to a constant value of 2, denoting that Qfinal typically is in the range from 0.0 to 0.5, and thus in practice requires multiplication by 2 to better map it to the range from 0.0 to 1.0.

Figure 5:
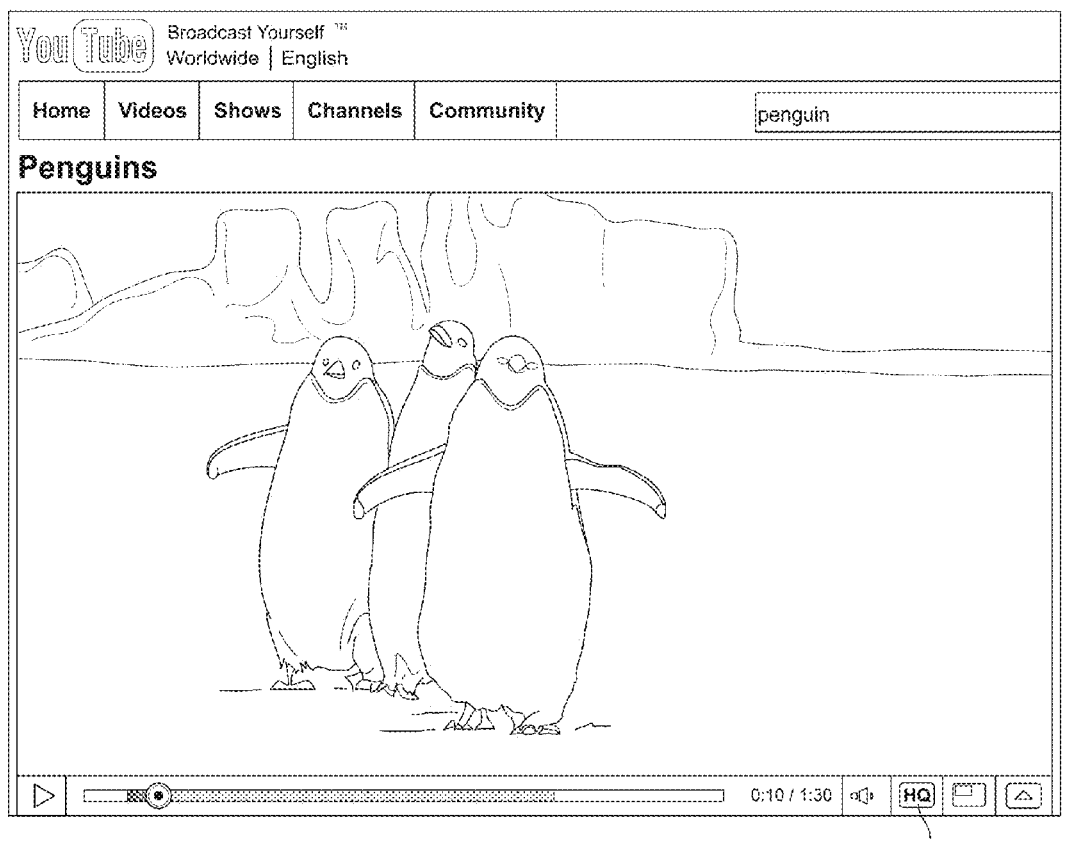
FIG. 5 is a user interface depicting one application of the calculated relative quality score, in accordance with one embodiment.

The final quality score can then be applied 230. In one embodiment, if the final quality score is above some threshold value indicating a sufficient improvement of the high-quality version of the video with respect to the low-quality version, then the video system 100 stores 230A the high-quality version of the video in the video repository 105. The video system 100 further makes 230B the high-quality version accessible via a user interface provided by the video system 100. For example, when providing a requested video to the client 170 of FIG. 1, the video system 100 can provide a user interface such as that depicted in FIG. 5, in which a button 510 with caption "HQ" indicates that a high-quality version of the video is available and may be displayed by selecting the button. In contrast, if the final quality score is not about the threshold value, then in some embodiments the high-quality version of the video is not stored (or is removed) from the video repository 105 and the button 510 is not displayed in the user interface of FIG. 5.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of determining whether to provide a high quality transcoded version of a source video stored in a video repository, comprising:
   generating a low-quality transcoded version of the source video;
   generating a high-quality transcoded version of the source video having higher quality than the low-quality transcoded version;
   determining a relative quality score that quantifies a difference in quality between the high-quality transcoded version and the low-quality transcoded version;
   determining a weighting factor as a function of a quality of the source video, the weighting factor configured to limit the relative quality score to an upper bound when the source video is of poor quality;
   adjusting the relative quality score by applying the weighting factor to the relative quality score; and
   responsive at least in part to the adjusted relative quality score indicating at least a threshold level of quality, storing the high-quality transcoded version of the video in the video repository.

2. The method of claim 1, wherein determining the weighting factor comprises computing the weighting factor based on a number of frames per second in the source video.

3. The method of claim 1, wherein determining the weighting factor comprises computing the weighting factor based on a blockiness measure associated with the source video, the blockiness measure indicating an extent to which blocks representing a frame in the source video have been encoded with an insufficient level of detail.

4. The method of claim 3, further comprising determining the blockiness measure by measuring a difference in luminance values of pixels along a boundary of a first block representing the frame and pixels along a boundary of a second block representing the frame, the boundary of the first block being adjacent to the boundary of the second block.

5. The method of claim 3, wherein computing weighting factor comprises setting the weighting factor to be a first value when the blockiness measure is lower than a blockiness threshold or a second value when the blockiness measure is higher than the blockiness threshold, the first value being lower than the second value.

6. The method of claim 1, wherein adjusting the relative quality score comprises multiplying the relative quality score by the weighting factor.

7. The method of claim 1, wherein the difference in quality is based on a degree of similarity between the high-quality transcoded version and the source video and a degree of similarity between the low-quality transcoded version and the source video.

8. A non-transitory computer-readable storage medium storing a computer program executable by a processor for determining whether to provide a high quality transcoded version of a source video stored in a video repository, the computer program controlling the processor to perform operations comprising:
generating a low-quality transcoded version of the source video;
generating a high-quality transcoded version of the source video having higher quality than the low-quality transcoded version;
determining a weighting factor as a function of a quality of the source video, the weighting factor configured to limit the relative quality score to an upper bound when the source video is of poor quality;
adjusting the relative quality score by applying the weighting factor to the relative quality score; and
responsive at least in part to the adjusted relative quality score indicating at least a threshold level of quality, storing the high-quality transcoded version of the video in the video repository.

9. The computer-readable storage medium of claim 8, the computer program controlling the processor to perform operations further comprising determining the weighting factor by computing the weighting factor based on a number of frames per second in the source video.

10. The computer-readable storage medium of claim 8, the computer program controlling the processor to perform operations further comprising determining the weighting factor by computing the weighting factor based on a blockiness measure associated with the source video, the blockiness measure indicating an extent to which blocks representing a frame in the source video have been encoded with an insufficient level of detail.

11. The computer-readable storage medium of claim 10, the computer program controlling the processor to perform operations further comprising determining the blockiness measure by measuring a difference in luminance values of pixels along a boundary of a first block representing the frame and pixels along a boundary of a second block representing the frame, the boundary of the first block being adjacent to the boundary of the second block.

12. The computer-readable storage medium of claim 10, wherein computing weighting factor comprises setting the weighting factor to be a first value when the blockiness measure is lower than a blockiness threshold or a second value when the blockiness measure is higher than the blockiness threshold, the first value being lower than the second value.

13. The computer-readable storage medium of claim 8, wherein adjusting the relative quality score comprises multiplying the relative quality score by the weighting factor.

14. The computer-readable storage medium of claim 8, wherein the difference in quality based on a degree of similarity between the high-quality transcoded version and the source video and a degree of similarity between the low-quality transcoded version and the source video.

15. A computer system comprising:
a processor; and
a transcoding module executing on the processor, the transcoding module controlling the processor to perform operations comprising:
generating a low-quality transcoded version of the source video;
generating a high-quality transcoded version of the source video having higher quality than the low-quality transcoded version;
determining a weighting factor as a function of a quality of the source video, the weighting factor configured to limit the relative quality score to an upper bound when the source video is of poor quality;
adjusting the relative quality score by applying the weighting factor to the relative quality score; and
responsive at least in part to the adjusted relative quality score indicating at least a threshold level of quality, storing the high-quality transcoded version of the video in the video repository.

16. The computer system of claim 15, the transcoding module controlling the processor to perform operations further comprising determining the weighting factor by computing the weighting factor based on a number of frames per second in the source video.

17. The computer system of claim 15, the transcoding module controlling the processor to perform operations further comprising determining the weighting factor by computing the weighting factor based on a blockiness measure associated with the source video, the blockiness measure indicating an extent to which blocks representing a frame in the source video have been encoded with an insufficient level of detail.

18. The computer system of claim 17, the transcoding module controlling the processor to perform operations further comprising determining the blockiness measure by measuring a difference in luminance values of pixels along a boundary of a first block representing the frame and pixels along a boundary of a second block representing the frame, the boundary of the first block being adjacent to the boundary of the second block.

19. The computer system of claim 17, wherein computing weighting factor comprises setting the weighting factor to be a first value when the blockiness measure is lower than a blockiness threshold or a second value when the blockiness measure is higher than the blockiness threshold, the first value being lower than the second value.

20. The computer system of claim 15, wherein adjusting the relative quality score comprises multiplying the relative quality score by the weighting factor.

* * * * *